(12) United States Patent
Petty, Jr.

(10) Patent No.: US 8,468,283 B2
(45) Date of Patent: Jun. 18, 2013

(54) ARBITER DIAGNOSTIC APPARATUS AND METHOD

(75) Inventor: John Stewart Petty, Jr., Chapel Hill, NC (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1651 days.

(21) Appl. No.: 11/445,064

(22) Filed: Jun. 1, 2006

(65) Prior Publication Data

US 2007/0283066 A1 Dec. 6, 2007

(51) Int. Cl.
G06F 13/14 (2006.01)
G06F 13/364 (2006.01)
G06F 11/00 (2006.01)

(52) U.S. Cl.
USPC ............ 710/241; 710/113; 710/309; 714/48; 714/814

(58) Field of Classification Search
USPC ............ 710/309, 113, 240, 241; 714/48–51, 714/746, 799, 814–815
See application file for complete search history.

(56) References Cited

U.S. PATENT DOCUMENTS

| | | | |
|---|---|---|---|
| 5,754,803 A | 5/1998 | Regis | |
| 5,778,200 A * | 7/1998 | Gulick | 710/113 |
| 5,956,493 A * | 9/1999 | Hewitt et al. | 710/113 |
| 6,108,739 A * | 8/2000 | James et al. | 710/113 |
| 6,216,189 B1 | 4/2001 | Kim | |
| 6,226,702 B1 | 5/2001 | Yakashiro | |
| 6,304,923 B1 * | 10/2001 | Klein | 710/41 |
| 6,308,211 B1 | 10/2001 | Rosborough et al. | |
| 6,473,841 B1 | 10/2002 | Ueda et al. | |
| 6,513,082 B1 | 1/2003 | Fischer et al. | |
| 6,580,898 B1 | 6/2003 | Oguri | |
| 6,848,015 B2 | 1/2005 | Jones | |
| 7,039,916 B2 * | 5/2006 | Jason, Jr. | 718/105 |
| 7,093,256 B2 * | 8/2006 | Bloks | 718/102 |

(Continued)

FOREIGN PATENT DOCUMENTS

| | | |
|---|---|---|
| JP | 01233643 A | 9/1989 |
| JP | H02-23445 A | 1/1990 |

(Continued)

OTHER PUBLICATIONS

"Excessive", Encarta Dictionary Online, printed Jan. 2, 2009, 1 page.*

(Continued)

Primary Examiner — Tim T Vo
Assistant Examiner — Trisha Vu
(74) Attorney, Agent, or Firm — Coats & Bennett, P.L.L.C.

(57) ABSTRACT

An arbitration diagnostic circuit and method provide diagnostic information in arbitration-based systems and/or provide detection of and response to excessive arbitration delays. For example, in one embodiment, an arbitration diagnostic circuit maintains a chronological memory trace of arbitration events, including resource request events and corresponding resource grant events for two or more entities having arbitrated access to a shared resource. The trace, which may be regarded as a running, ordered list, may comprise time-stamped event identifiers, which aid the analysis of arbitration related errors or failures. Indeed, in one or more embodiments, an arbitration diagnostic circuit is configured to track elapsed times for resource requests, and to detect resource grant delay violations. Delay violations can be logged, along with the other arbitration state information, and the arbitration diagnostic circuit can be configured to freeze systems or sub-systems responsive to detecting delay violations and/or to capture various state information.

26 Claims, 5 Drawing Sheets

U.S. PATENT DOCUMENTS

| | | | |
|---|---|---|---|
| 7,148,532 B2 * | 12/2006 | Nomura et al. | 257/295 |
| 7,263,566 B2 * | 8/2007 | Ganasan et al. | 710/118 |
| 2002/0007422 A1 | 1/2002 | Bennett | |
| 2005/0021708 A1 * | 1/2005 | Raghuraman et al. | 709/223 |

FOREIGN PATENT DOCUMENTS

| | | |
|---|---|---|
| JP | H02-58149 A | 2/1990 |
| JP | 3240152 | 10/1991 |
| JP | H08-305641 A | 11/1996 |
| JP | 11296412 A | 10/1999 |
| JP | 2000132430 A | 5/2000 |
| JP | 2000132431 A | 5/2000 |
| JP | 2004078508 | 3/2004 |
| JP | 2005018640 A | 1/2005 |
| JP | 2005032267 A | 2/2005 |
| JP | 2005275444 A | 10/2005 |
| WO | 2005017724 A2 | 2/2005 |

OTHER PUBLICATIONS

"Arbitration History Buffer," IBM Technical Disclosure Bulletin, Nov. 1993, pp. 317-319, vol. 36, No. 11, XP-000424875.

* cited by examiner

ARBITER DIAGNOSTIC APPARATUS AND METHOD

BACKGROUND

The present invention generally relates to the arbitration of shared system resources, such as a bus or memory, and particularly relates to arbitration diagnostics.

Contemporary electronic devices incorporate increasingly sophisticated processing systems to handle various operational functions. For example, mobile communication handsets, handheld gaming systems, portable digital assistants, etc., provide an increasing wealth of multimedia functions supported by graphics, audio, communication, and display processing subsystems. The different subsystems generally include dedicated hardware and software processing elements, but they commonly share selected system resources, such as memory, buses, etc.

In such systems, "arbiters" coordinate shared resource accesses by competing entities, based on granting, denying, and deferring access requests made by individual ones of the competing entities. For example, a bus arbiter manages access to a shared system bus by two or more processing subsystems, each needing independent access to the bus. In this role, the arbiter grants bus access temporarily to one subsystem, while blocking bus accesses by the other subsystems.

Resource arbitration thus provides a mechanism for coordinated sharing of resources, but it also complicates system diagnostics. For example, in a distributed processing system using resource arbitration, arbitration processing may block a given subsystem from shared resource access for longer than can be tolerated, leading to an overall system fault. Diagnosing arbitration-induced faults presents significant challenges because of the complex processing states involved with the various subsystems, the "inter-relatedness" of these subsystem states, and the general unavailability of comprehensive arbitration state information at the point and time of failure.

SUMMARY

In one embodiment, a method of resource arbitration diagnostic processing comprises detecting arbitration events for two or more entities having arbitrated access to a shared resource, and maintaining a chronological memory trace of the arbitration events. For example, an arbitration diagnostic circuit can be configured to interface with an arbitration controller, to detect resource request and grant events managed by the controller. Optionally, event tracking includes resource release events, denoting resource release times associated with the resource requesting and granting operations.

In one or more embodiments, the chronological memory trace of the arbitration events comprises a running list of time-stamped arbitration events. Time-stamp information may be locally generated by an associated arbitration circuit, by the arbitration diagnostic circuit, or may be generated elsewhere in the system and provided as a reference signal to the arbitration diagnostic circuit. In any case, time-stamping provides one basis for determining resource grant delays, i.e., the delays between individual resource requests and the corresponding resource grants. These times may be important, for example, in systems where excess resource grant delays can cause the requesting entity to fail, stall, or otherwise operate erroneously.

Thus, the arbitration diagnostic method further comprises, in one or more embodiments, detecting excessive resource grant delays. Such detection can be based on comparing resource grant delays for given resource request events against corresponding delay limits. The delay limits, which can be stored in one or more memories accessible to an arbitration diagnostic circuit, may be defined individually for the different entities for which arbitration event tracking is active.

Effectively, then, the arbitration diagnostic circuit can be configured to calculate the resource grant delays by tracking elapsed times after detecting resource request events, and comparing the elapsed times to maximum grant delay limits defined for the two or more entities. Elapsed time tracking uses, for example, the time stamp information captured for resource request events, and one or more hardware or software timing functions, which may be driven by a system clock, for example. In one or more embodiments, the arbitration diagnostic method comprises performing one or more actions responsive to detecting an excessive resource grant delay. Such actions include one or more of storing resource grant delay violation information in the running list, freezing the running list, asserting a system halt signal, asserting a delay violation alert signal, capturing arbitration state information, and capturing entity state information for one or more of the two or more entities having arbitrated access to the shared resource.

Thus, in at least one embodiment, an arbitration diagnostic method comprises tracking delay times between resource requests and corresponding resource grants for respective ones of two or more entities having arbitrated access to a shared resource, and detecting resource grant delay violations by comparing the delay times to one or more defined delay limits. The method further comprises asserting a resource grant delay violation signal responsive to detecting a resource grant delay violation, and may include capturing arbitration state information responsive to detecting a resource grant delay violation. Of course, such processing may include maintaining a chronological memory trace of arbitration events for the two or more entities, including resource request events and corresponding resource grant events.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
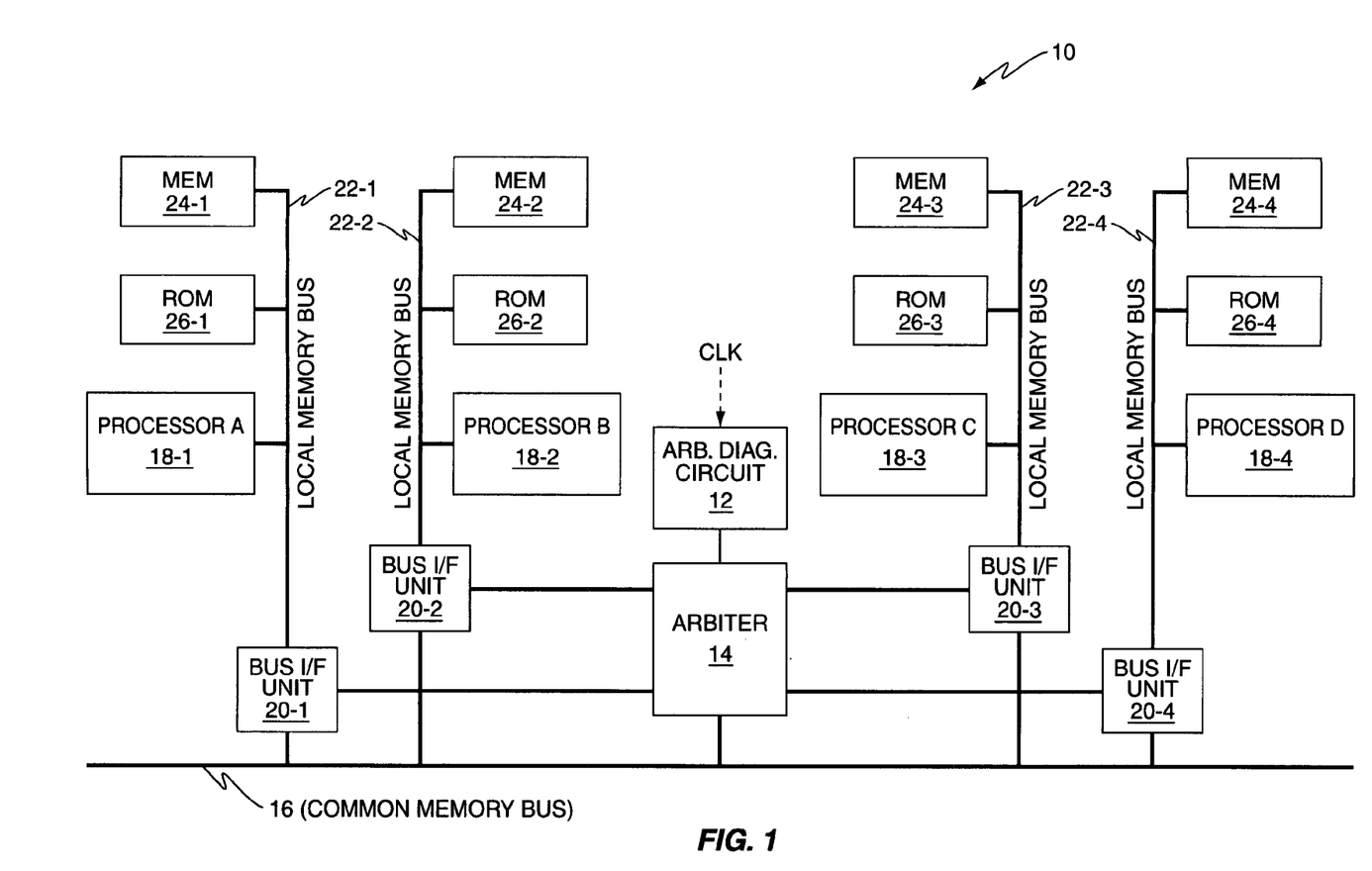
FIG. 1 is a block diagram of one embodiment of an arbitration diagnostic circuit, illustrated in the context of one or more entities having arbitrated access to a shared resource.

FIG. 1 illustrates a system 10 that includes an embodiment of an arbitration diagnostic circuit 12, which is configured to detect arbitration events for two or more entities having arbitrated access to a shared resource, to maintain a chronological memory trace of the arbitration events. For example, the illustrated system 10 includes an arbitration circuit (arbiter 14), a common memory bus 16, and multiple processing entities 18-1 through 18-4, which are individually coupled to the arbiter 14 and the common memory bus 16 through respective ones of the multiple bus interface units 20-1 through 20-4. Further, respective ones of the processing entities 18-1 through 18-4 have local memory buses 22-1 through 22-4, coupling them to RAMs 24-1 through 24-4 and ROMs 26-1 through 26-4.

In the above context, the processors 18-1 through 18-4 have arbitrated access to the common memory bus 16, which represents one type of shared resource contemplated herein. Other non-limiting examples of shared resources include Direct Memory Access (DMA) controllers, graphics and numeric coprocessors, signal processing hardware, and other hardware or software subsystems that may be commonly used by more than one system entity.

In operation, individual ones of the processors 18 submit resource requests to the arbiter 14 via corresponding ones of the bus interface units. The arbiter 14 responds to individual ones of these requests via respective ones of the bus interface units 20, by granting access to the common memory bus 16 if it is available for assignment, or by denying/deferring the requested access if the common memory bus 16 is unavailable.

Figure 2:
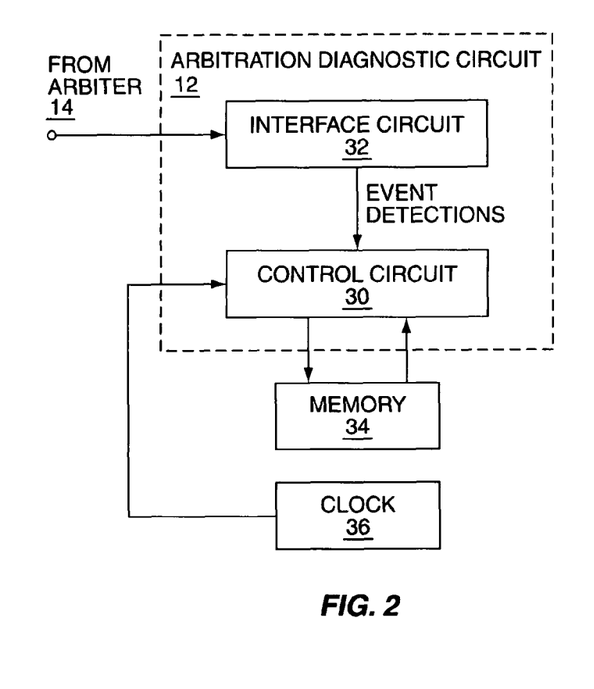
FIG. 2 is a block diagram of one embodiment of an arbitration diagnostic circuit.

The arbitration diagnostic circuit 12 "monitors" at least some of the above arbitration events, for the purpose of maintaining a chronological memory trace, which provides a running list of ongoing arbitration events. For example, FIG. 2 illustrates that one embodiment of the arbitration diagnostic circuit 12 comprises a control circuit 30 and an interface circuit 32, and may further comprise, or at least be associated with, one or more (trace) memory circuits 34 and a clock circuit 36, which may be a global or local timing signal source.

Those skilled in the art will appreciate that the control and interface circuits 30 and 32 may comprise physical or functional circuits, and may be implemented in hardware, software, or any combination thereof. Thus, the arbitration diagnostic circuit 12 may comprise dedicated hardware, such as a dedicated microprocessor circuit or dedicated program logic in an ASIC, FPGA, or other programmable logic device, or may comprise part of the processing resources included in the arbiter 14, for example.

Figure 3:
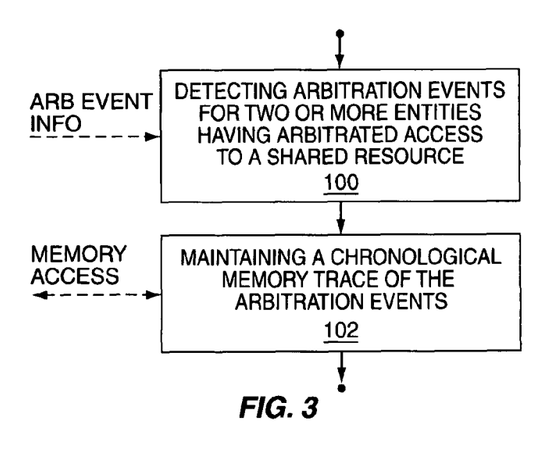
FIG. 3 is a logic flow diagram of one embodiment of arbitration diagnostic processing.

Regardless of whether the arbitration diagnostic circuit 12 is implemented functionally or physically as a stand-alone circuit, or is implemented within another circuit, FIG. 3 illustrates one embodiment of an arbitration diagnostic processing method. The illustrated method may be implemented, for example, as a computer product or as logical processing hardware. Regardless, the illustrated processing assumes ongoing arbitration, and thus processing "begins" with detecting arbitration events for two or more entities having arbitrated access to a shared resource (Step 100). For example, the interface circuit 32 is communicatively coupled to the arbiter 14, such that the arbitration diagnostic circuit 12 detects arbitration events based on receiving arbitration event information for at least some types of arbitration events, such as resource request events, resource grant events, and resource release events.

Processing continues with the arbitration diagnostic circuit 12 maintaining a chronological memory trace of (at least some) of the arbitration events. For example, in one or more embodiments, the interface circuit 32 receives notification from the arbiter 14 of resource requests and resource grants, and provides such notifications to the control circuit 30. In turn, the control circuit 30 uses the arbitration event notifications to maintain a chronological memory trace 40, such as the embodiment shown in FIG. 4. The number of events maintained in the running list, along with the richness of list entry data maintained for the listed events, defines the "size" of the chronological memory trace 40. Generally, larger lists are more useful for diagnosing arbitration-related system errors, but the number of entries and/or the format and amount of event information stored for each entry can be adapted as needed or desired for a particular design.

Figure 4:
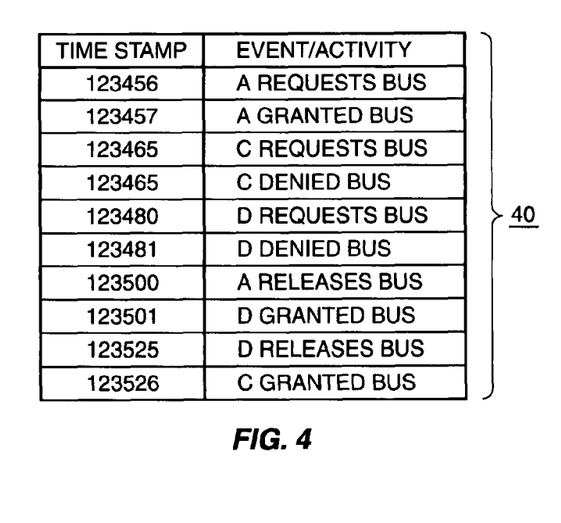
FIG. 4 is a table illustrating one embodiment of a chronological memory trace containing arbitration diagnostic information.

With FIG. 4 as a non-limiting example, one sees that the arbitration diagnostic circuit 12 can be configured to maintain the chronological memory trace as an ordered list of time-stamped arbitration events. For example, entity "A" requested the shared resource at time stamp "123456," and the arbiter 14 granted that request at time stamp "123457." Continuing, entity "C" requested the shared resource at time stamp "123465," and entity C was denied at time stamp "123465." Other entries in the example list are self-explanatory.

Broadly, the arbitration diagnostic circuit 12 is configured to detect resource requests and corresponding resource grants as arbitration events, and, optionally, is further configured to detect resource releases as arbitration events. Regardless of the particular arbitration events detected and logged by the arbitration diagnostic circuit 12, one or more embodiments of the interface circuit 32 comprise a signaling interface communicatively coupled to (or included within) the arbiter 14, wherein the interface circuit 32 is configured to receive arbitration event signals from the arbiter 14.

Communication of event information to the control circuit 30 via the interface circuit 32 enables the arbitration diagnostic circuit 12 to maintain the chronological memory trace 40 of the arbitration events as a running list of time-stamped arbitration events. For example, as seen in FIG. 4, maintaining the running list includes storing time-stamped event identifiers for resource request events and resource release events. Time-stamped resource release events also may be tracked and logged by the arbitration diagnostic circuit 12. In any case, the arbitration diagnostic circuit 12 logs arbitration events as time-stamped event identifiers, such that the chronological memory trace 40 depicts a moving "picture" of ongoing arbitration activity.

The chronological memory trace 40 can be saved for manual or automated analysis. In one embodiment, the memory 34 includes one or more non-volatile memory circuits, such as EEPROM, FLASH, battery-backed SRAM, or the like. On this point, it should be noted that the memory circuit 34 may comprise distributed or centralized memory circuits, depending upon system implementation details, and it should be further understood that one or more embodiments of memory 34 may be based on volatile memory.

Identifying excessive resource grant delays represents one of numerous useful diagnostic analyses supported by having time-stamped resource request and resource grant events stored in the chronological memory trace 40. That is, the ability of a given entity to continue nominal, ongoing operations generally depends on that entity's ability to gain timely access to shared resources, meaning that an excessively long deferral of the entity's resource request by the arbiter 14 can result in erroneous or failed operation.

Thus, in one embodiment of the arbitration diagnostic circuit 12, the control circuit 30 is configured to detect excessive resource grant delays based on comparing resource grant delays for given resource request events against corresponding delay limits. Such operation comprises, in one or more embodiments, calculating the resource grant delays by tracking elapsed times after detecting resource request events, and comparing the elapsed times to maximum grant delay limits defined for the two or more entities having arbitrated access to a shared resource.

Figures 5, 6, 7:
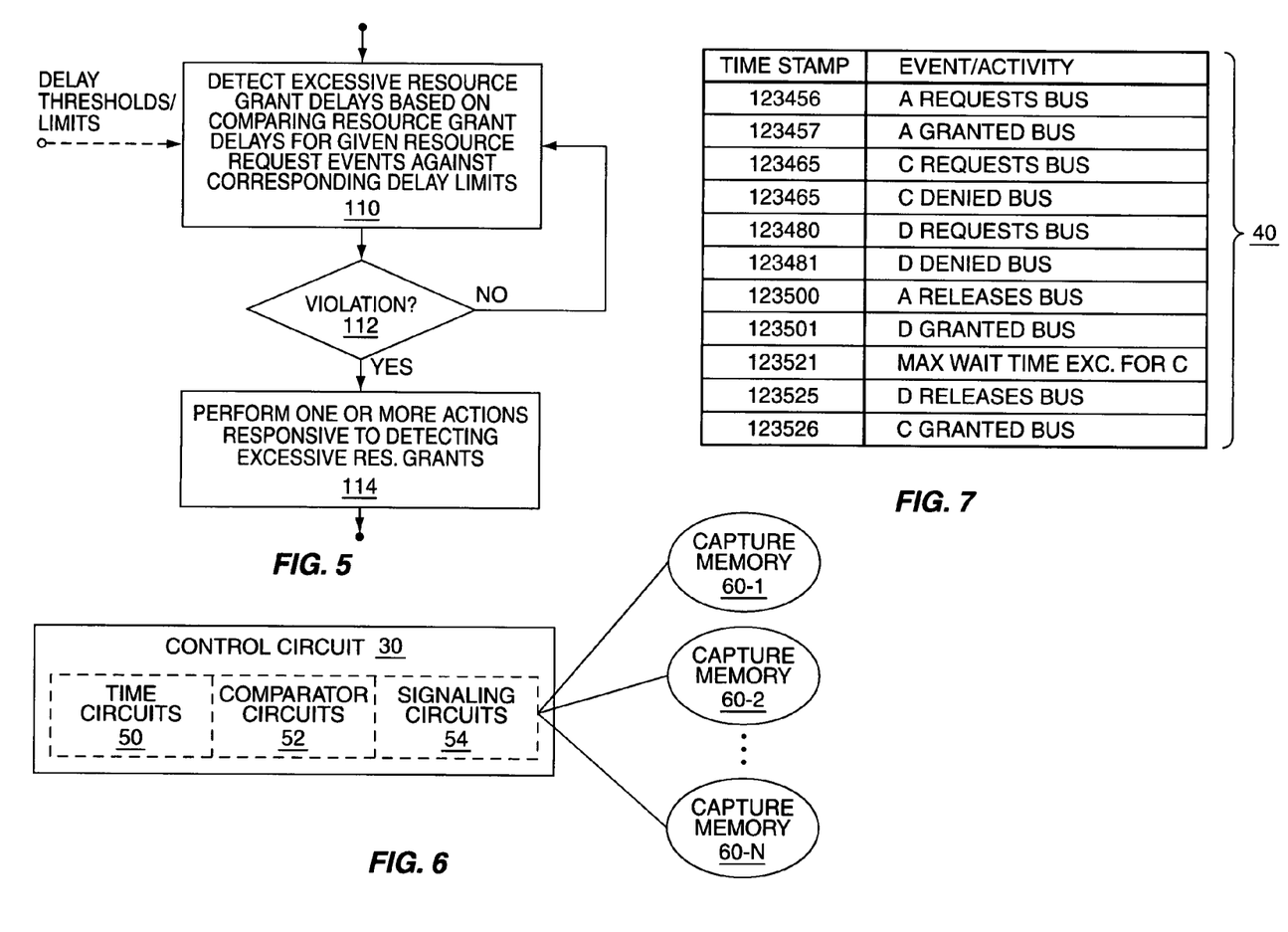
FIG. 5 is a logic flow diagram of another embodiment of arbitration diagnostic processing.
FIG. 6 is a block diagram of another embodiment of an arbitration diagnostic circuit.
FIG. 7 is a table illustrating another embodiment of a chronological memory trace containing arbitration diagnostic information.

FIG. 5 illustrates one embodiment of processing logic that can be implemented by the arbitration diagnostic circuit 12 in hardware or software, for detecting and responding to excessive resource grant delays. The illustrated processing assumes ongoing shared resource arbitration, and "begins" with the control circuit 30 monitoring for excess grant delays (Step 110). For example, in one embodiment, the control circuit 30 detects excess resource grant delays by comparing resource grant delays for given resource request events against corresponding delay limits. The allowable maximum grant delays that can be tolerated by given ones of the entities having arbitrated access to a shared resource, e.g., by a given one of the processors 18 illustrated in FIG. 1, can be stored in memory 34, or in memory elsewhere in the system 10. Wherever stored, the control circuit 30 can use such delay limit information in determining grant delay violations.

If a grant delay violation occurs (Step 112), processing continues with the control circuit 30 performing one or more actions (Step 114). The action(s) taken by the arbitration diagnostic circuit 12 can be configured according to the needs or desires of the system 10, and can vary based on which entity's grant delay limit was violated. That is, a grant delay violation may be non-critical but still of system-level interest for one of the processors 18, but, for another one of the processors 18, any grant delay violation may be critical. Thus, the control circuit 30 may, in response to detecting a grant delay violation, perform any one or more of the following actions: storing resource grant delay violation information in the running list (of arbitration events), freezing the running list, asserting a system halt signal, asserting a delay violation alert signal, capturing arbitration state information, and capturing entity state information for one or more of the two or more entities having arbitrated access to the shared resource.

Again, the particular action(s) taken by the arbitration diagnostic circuit 12 in response to detecting a resource grant delay violation can be uniform, regardless of which entity suffers the violation, or can vary according to fixed or programmable logic, such that the control circuit 30 provides different responses, depending on which entity suffers the violation. In one or more embodiments, the trace memory 34, or other memory accessible to the arbitration diagnostic circuit 12, stores delay limit information and any delay response configuration information.

With delay violation operations in mind, FIG. 6 illustrates one embodiment of the control circuit 30, wherein it comprises one or more hardware or software timer circuits 50, one or more comparator circuits 52, and one or more signaling circuits 54. With the corresponding chronological memory trace 40 of FIG. 7 as an example, the timer circuits 50 are configured to track elapsed time relative to detecting new resource request events, using the same clock source used for time stamping, or using any local or global clock source. The elapsed timer clock source should have a suitable resolution in relation to the time stamping resolution.

Thus, the control circuit 30 detects a new resource request event, logs a corresponding time-stamped event identifier in the running list that comprises the chronological memory trace 40, and starts a delay timer by allocating corresponding timing hardware or software in the timer circuits 50. Within the limits of its software or hardware resources, the control circuit 30 may repeat this process as needed to track elapsed times for multiple, concurrent resource request events.

Regardless, for a given resource request event, the elapsed time value can be provided as one input to a software or hardware comparator circuit included in the comparator circuits 52, with the other input being the corresponding delay limit defined for the requesting entity. If the elapsed time meets or exceeds the defined delay limit, the comparator circuits 52 indicate a delay violation for the involved entity. In response, the signaling circuits 54 undertake one or more desired actions.

For example, the signaling circuits 54 may signal distributed capture memories 60-1 through 60-N to capture system state information. Such state information may, for example, be collected for the individual entities and/or be collected at the system level. As such, the capture memories may be co-located with, or integrated with, various ones of the entities, and with other system elements (not shown). Of course, the chronological memory trace 40 represents a relatively detailed set of ordered arbitration states and, independent of whether other system or entity state information is captured, the arbitration diagnostic circuit 12 may capture its current arbitration state information. Note, too, that in embodiments where the arbitration diagnostic circuit 12 is configured to freeze the chronological memory trace 40 and/or freeze system operation, the last two time-stamped events would not occur-i.e., the running list would be frozen upon detecting that the maximum resource grant delay for entity "C" was violated.

Figure 8:
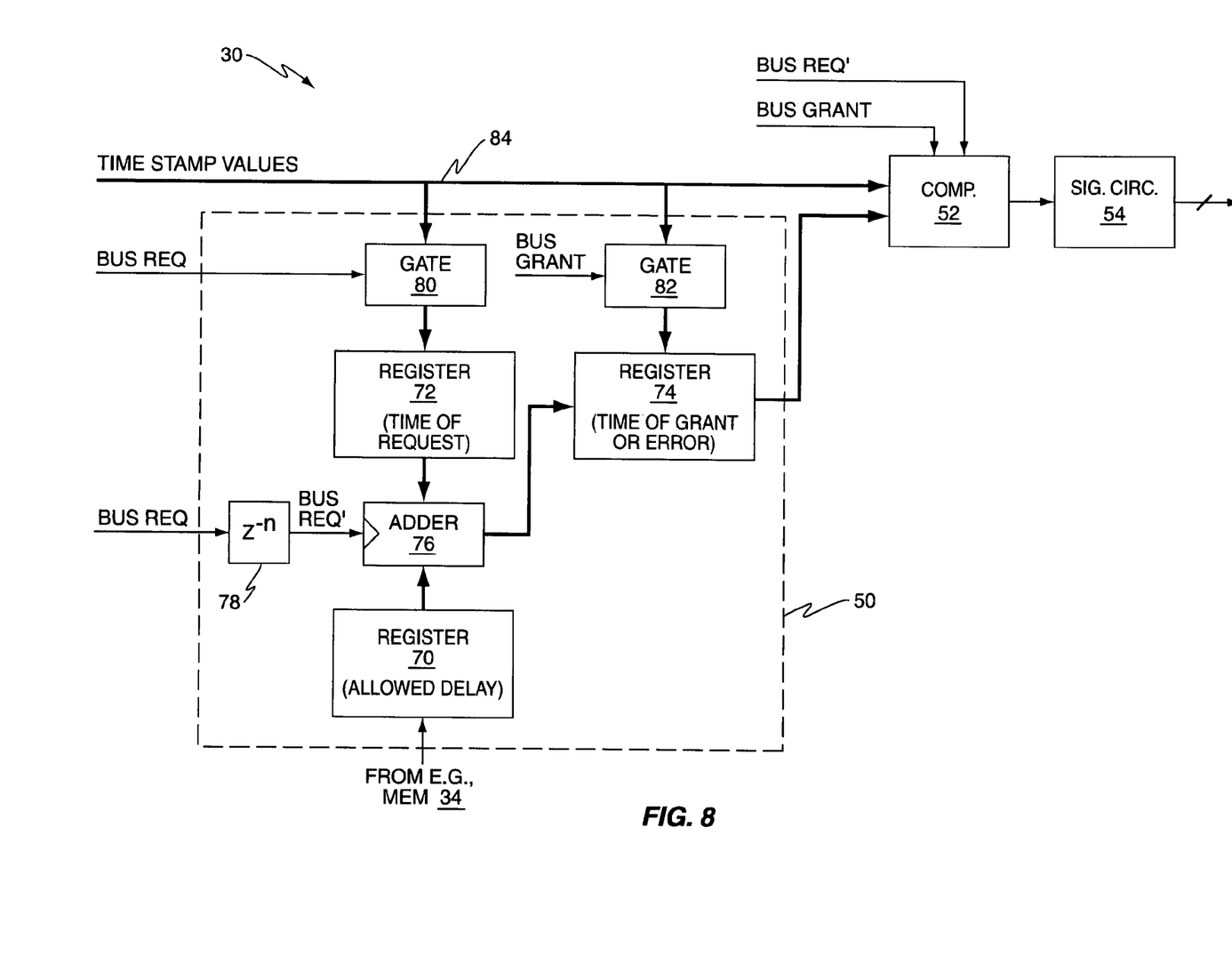
FIG. 8 is a block diagram of circuit details for one embodiment of the arbitration diagnostic circuit of FIG. 6.

With the above processing logic in mind, FIG. 8 illustrates functional circuit details for one embodiment of the arbitration diagnostic circuit 12 illustrated in FIG. 6. The illustrated time circuits 50 include registers 70, 72, and 74, an adder circuit 76, a delay circuit 78, and gating circuits 80 and 82, that together provide resource grant delay tracking for driving the comparator and signaling circuits 52 and 54, for grant delay error signaling.

Figure 9:
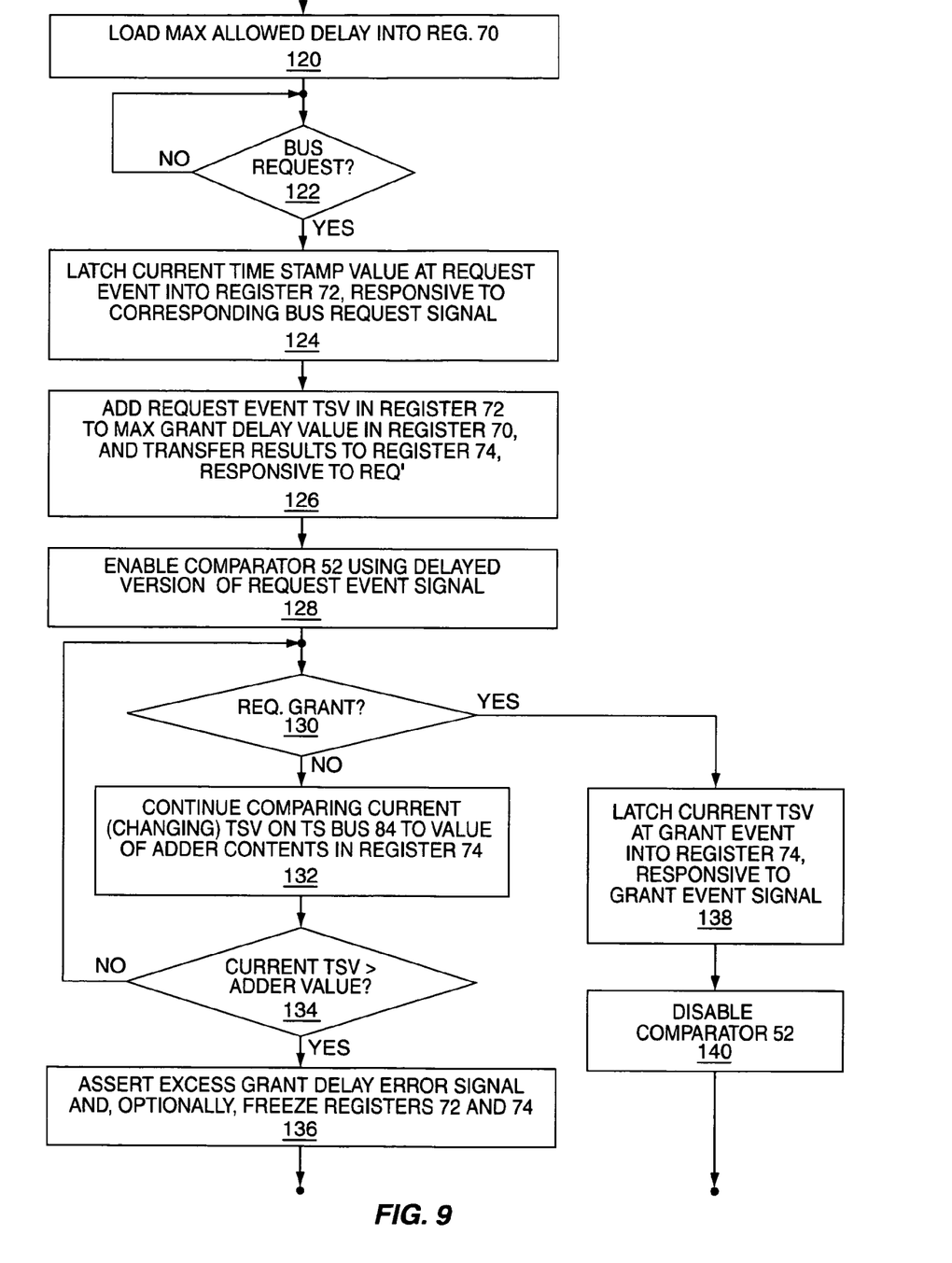
FIG. 9 is a logic flow diagram of one embodiment of arbitration diagnostic processing logic.

FIG. 9 illustrates one embodiment of processing logic implemented by the functional circuits of FIG. 8, and it should be understood that such processing can be implemented by the arbitration diagnostic circuit 12 via hardware, software, or any combination thereof. Further, it should be understood that such processing may be implemented for each entity 18 competing for access to the shared resource 16, such that grant delay processing can be carried out concurrently for multiple entities.

To support that, at least the time circuits 50 illustrated in FIG. 8 may be duplicated within the arbitration diagnostic circuit 12. For example, some or all of the circuitry illustrated in FIG. 8 may be duplicated for each entity 18, for which request grant delay tracking is desired. In particular, in at least one embodiment, one register 70 is instantiated for each entity 18 being monitored and the registers 72 and 74 may be implemented as a circular buffer for each such entity 18. With the registers 72 and 74 implemented as circular buffers, time stamp trace information can be maintained in them, wherein the oldest entries are overwritten with the newest entries.

With the above points in mind, and assuming ongoing system operations, the illustrated processing "begins" with loading the maximum allowed grant delay value into the register 70 (Step 120). For example, assuming that FIG. 9 relates to grant delay tracking for a particular one of the entities 18, the memory 34, which may be a non-volatile memory, stores a maximum delay value that may be transferred into the register 70 at reset or system start.

With the maximum delay value, which may be expressed as time stamp (TS) counts, loaded into the register 70, processing continues with monitoring for a request event for the entity 18 being monitored (Step 122). In response to detecting the request event, the time stamp value (TSV) currently on the time stamp bus 84 is latched into the register 72 through the gate 80 (Step 124). Concurrent, or nearly concurrent with this, the adder 76 is enabled, the results are latched into register 74, and the comparator 52 is enabled, using a delayed version of the request event signal (Steps 126 and 128). Thus, the adder 76 adds the request event TSV as captured in the register 72 and the maximum grant delay value as stored in the register 70, and the sum is transferred to the register 74, for use by the comparator 52.

A delay element 78 may be used to generate a delayed version of the request event signal, i.e., REQ', where the non-delayed version is identified as REQ. Generally, the amount of delay time needed will depend on the implementation details, and will be set as a matter of time. It is sufficient to delay long enough to meet the data setup and hold timing requirements for the adder 76 relative to the actual assertion of the REQ signal.

In any case, processing continues with monitoring for the corresponding request grant event (Step 130). If the request grant event is not detected, processing continues with the comparator 52 comparing the current (dynamically) updating TSV on the time stamp bus 84 with the contents of the register 74 (Step 132), which contents are the sum of registers 70 and 72. If the current TSV is greater than the sum held in the register 74—i.e., the value from adder 76, the comparator 52 detects that condition as a grant delay violation and asserts an error signal, which can be propagated as needed by the signaling circuits 54 (Steps 134 and 136). Note that the contents of the contents of registers 72 and 74 may be frozen as part of such processing, for diagnostic use.

On the other hand, if the current TSV does not exceed the sum held in the register 74, the maximum grant delay is not yet violated and processing returns to monitoring for the request grant event (Step 130). Thus, if a request grant event occurs before a grant delay violation occurs, processing continues with capturing the TSV on the time stamp bus 84 occurring at the request grant event into the register 74, thereby overwriting the sum value from adder 76 (Step 138) and preserving actual request grant time stamp information for diagnostic recording. The request grant signal is also used to disable the comparator and thereby prevent false error assertion (Step 140).

Those skilled in the art will appreciate that the above process is repeated for subsequent request event detections. Further, as noted, all such processing can be carried out on a concurrent basis for multiple requesting entities 18.

Thus, even without capturing a running list of arbitration events, the arbitration diagnostic circuit 12 can be configured to provide resource grant delay violation detection and response functions. Broadly, in one or more embodiments, the arbitration diagnostic circuit 12 implements a method of tracking delay times between resource requests and corresponding resource grants for respective ones of two or more entities having arbitrated access to a shared resource. In such embodiments, the arbitration diagnostic circuit 12 detects resource grant delay violations by comparing the delay times to one or more defined delay limits.

Of course, the present invention is not limited by the foregoing discussion, nor is it limited by the accompanying drawings. Indeed, the present invention is limited only by the following claims, and their legal equivalents.

What is claimed is:

1. A method of resource arbitration diagnostic processing comprising:
   detecting arbitration events for two or more entities having arbitrated access to a shared resource;
   maintaining a chronological memory trace of the arbitration events; and
   diagnosing arbitration-related system errors using the chronological memory trace.

2. The method of claim 1, wherein detecting arbitration events comprises detecting resource requests and corresponding resource grants.

3. The method of claim 2, wherein detecting arbitration events further comprises detecting resource releases.

4. The method of claim 1, wherein maintaining a chronological memory trace of the arbitration events comprises maintaining a running list of time-stamped arbitration events.

5. The method of claim 4, wherein maintaining a running list of time-stamped arbitration events comprises storing time-stamped event identifiers for resource request events and resource grant events.

6. The method of claim 5, further comprising storing time-stamped event identifiers for resource release events.

7. The method of claim 5, further comprising detecting excessive resource grant delays based on comparing resource grant delays for given resource request events against corresponding delay limits.

8. The method of claim 7, further comprising calculating the resource grant delays by tracking elapsed times after detecting resource request events, and comparing the elapsed times to maximum grant delay limits defined for the two or more entities.

9. The method of claim 7, further comprising performing one or more of the following actions responsive to detecting an excessive resource grant delay: storing resource grant delay violation information in the running list, freezing the running list, asserting a system halt signal, asserting a delay violation alert signal, capturing arbitration state information, and capturing entity state information for one or more of the two or more entities having arbitrated access to the shared resource.

10. An arbitration diagnostic circuit comprising:
    an interface circuit configured to detect arbitration events for two or more entities having arbitrated access to a shared resource; and
    a control circuit configured to maintain a chronological memory trace of the arbitration events.

11. The arbitration diagnostic circuit of claim 10, wherein the arbitration diagnostic circuit is configured to detect resource requests and corresponding resource grants as arbitration events.

12. The arbitration diagnostic circuit of claim 11, wherein the arbitration diagnostic circuit further is configured to detect resource releases as arbitration events.

13. The arbitration diagnostic circuit of claim 12, wherein the interface circuit comprises a signaling interface communicatively coupled to an arbitration circuit, and wherein the interface circuit is configured to receive arbitration event signals from the arbitration circuit.

14. The arbitration diagnostic circuit of claim 10, wherein the control circuit is configured to maintain a chronological memory trace of the arbitration events by maintaining a running list of time-stamped arbitration events.

15. The arbitration diagnostic circuit of claim 14, wherein the control circuit is configured to maintain a running list of time-stamped arbitration events by storing time-stamped event identifiers for resource request events and resource release events.

16. The arbitration diagnostic circuit of claim 15, wherein the control circuit further is configured to store time-stamped event identifiers for resource release events.

17. The arbitration diagnostic circuit of claim 15, wherein the control circuit further is configured to detect excessive resource grant delays based on comparing resource grant delays for given resource request events against corresponding delay limits.

18. The arbitration diagnostic circuit of claim 17, wherein the control circuit further is configured to calculate the resource grant delays by tracking elapsed times after detecting resource request events, and comparing the elapsed times to maximum grant delay limits defined for the two or more entities.

19. The arbitration diagnostic circuit of claim 17, wherein the control circuit further is configured to perform one or more of the following actions responsive to detecting an excessive resource grant delay: storing resource grant delay violation information in the running list, freezing the running list, asserting a system halt signal, asserting a delay violation alert signal, capturing arbitration state information, and capturing entity state information for one or more of the two or more entities having arbitrated access to the shared resource.

20. The arbitration diagnostic circuit of claim 10, wherein the control circuit further comprises trace memory configured to store the chronological memory trace of arbitration events.

21. The arbitration diagnostic circuit of claim 20, wherein at least a portion of the trace memory comprises non-volatile memory.

22. An arbitration diagnostic method comprising:
tracking delay times between resource requests and corresponding resource grants for respective ones of two or more entities having arbitrated access to a shared resource; and
detecting resource grant delay violations by comparing the delay times to one or more defined delay limits.

23. The method of claim 22, further comprising asserting a resource grant delay violation signal responsive to detecting a request delay violation.

24. The method of claim 22, further comprising capturing arbitration state information responsive to detecting a resource grant delay violation.

25. The method of claim 22, further comprising maintaining a chronological memory trace of arbitration events for the two or more entities, including resource request events and corresponding resource grant events.

26. The method of claim 25, further comprising freezing the chronological memory trace of arbitration events responsive to detecting a resource grant delay violation.

* * * * *

UNITED STATES PATENT AND TRADEMARK OFFICE
CERTIFICATE OF CORRECTION

| | |
|---|---|
| PATENT NO. | : 8,468,283 B2 |
| APPLICATION NO. | : 11/445064 |
| DATED | : June 18, 2013 |
| INVENTOR(S) | : Petty, Jr. |

It is certified that error appears in the above-identified patent and that said Letters Patent is hereby corrected as shown below:

On the Title Page

In the Figure, delete "ARB EVENT INFO" and insert -- ARB. EVENT INFO. --, therefor.

In the Drawings

In Fig. 1, Sheet 1 of 5, delete "MEM 24-1" and insert -- RAM 24-1 --, therefor.

In Fig. 1, Sheet 1 of 5, delete "MEM 24-2" and insert -- RAM 24-2 --, therefor.

In Fig. 1, Sheet 1 of 5, delete "MEM 24-3" and insert -- RAM 24-3 --, therefor.

In the Specification

In Column 4, Line 27, delete ""123465. "" and insert -- "123465." --, therefor.

In the Claims

In Column 8, Line 49, in Claim 10, delete "resource; and" and insert -- resource; --, therefor.

Signed and Sealed this
Eighth Day of July, 2014

Michelle K. Lee
*Deputy Director of the United States Patent and Trademark Office*